US010805364B2

(12) United States Patent
Broadworth et al.

(10) Patent No.: US 10,805,364 B2
(45) Date of Patent: *Oct. 13, 2020

(54) ROUTING OF CONFERENCE PARTICIPANT BASED ON CALLER RECOGNITION

(71) Applicant: Level 3 Communications, LLC, Broomfield, CO (US)

(72) Inventors: Andrew James Broadworth, Thornton, CO (US); Gregory Thomas Ellison, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,001

(22) Filed: Oct. 30, 2018

(65) Prior Publication Data

US 2019/0075144 A1 Mar. 7, 2019

Related U.S. Application Data

(63) Continuation of application No. 13/971,531, filed on Aug. 20, 2013, now Pat. No. 10,122,771, which is a
(Continued)

(51) Int. Cl.
*H04L 29/06* (2006.01)
*H04L 12/18* (2006.01)
*H04M 3/56* (2006.01)

(52) U.S. Cl.
CPC ........ *H04L 65/403* (2013.01); *H04L 12/1818* (2013.01); *H04L 65/1076* (2013.01);
(Continued)

(58) Field of Classification Search
USPC ....................................................... 348/14.08
See application file for complete search history.

(56) References Cited

U.S. PATENT DOCUMENTS 5,280,583 A 1/1994 Nakayama et al.
5,623,603 A 4/1997 Jiang et al.
(Continued)

FOREIGN PATENT DOCUMENTS

EP 2053869 A1 4/2009
WO WO-2007040931 A1 4/2007

OTHER PUBLICATIONS

Canadian Examination Report, dated Oct. 25, 2018, Application No. 2,859,816, filed Dec. 20, 2012; 4 pgs.
(Continued)

*Primary Examiner* — Amal S Zenati

(57) ABSTRACT

Aspects of the present disclosure involve systems, methods, computer program products, and the like, for routing one or more requests to join or initiate a collaboration conference based on at least an identifier of a requesting device. In one embodiment, a telecommunications network obtains an identifier, such as the telephone number, of a device requesting to join or initiate a collaboration conference. The identifying information is then compared to a database of user accounts maintained by the network. The network may then prompt the user of the requesting device to join a particular conferencing bridge or provide particular conferencing features based on the one or more preferences associated with the user's account. A response to the prompt may be received and then acted upon by the network to connect the requesting device to a collaboration conference and/or provide the one or more conferencing features to the requesting device.

18 Claims, 9 Drawing Sheets

Related U.S. Application Data continuation-in-part of application No. 13/708,713, filed on Dec. 7, 2012, now Pat. No. 9,013,538.

(60) Provisional application No. 61/584,115, filed on Jan. 6, 2012, provisional application No. 61/584,122, filed on Jan. 6, 2012, provisional application No. 61/578,803, filed on Dec. 21, 2011, provisional application No. 61/578,810, filed on Dec. 21, 2011, provisional application No. 61/578,798, filed on Dec. 21, 2011, provisional application No. 61/578,794, filed on Dec. 21, 2011, provisional application No. 61/578,807, filed on Dec. 21, 2011.

(52) U.S. Cl.
CPC ...... *H04L 65/1093* (2013.01); *H04L 65/4038* (2013.01); *H04M 3/56* (2013.01); *H04M 2203/5045* (2013.01)

(56) References Cited

U.S. PATENT DOCUMENTS

| | | | |
|---|---|---|---|
| 5,825,858 A | 10/1998 | Shaffer et al. | |
| 5,828,743 A | 10/1998 | Pinnell | |
| 5,978,463 A | 11/1999 | Jurkevics | |
| 6,411,605 B1 | 6/2002 | Vance et al. | |
| 6,553,413 B1 | 4/2003 | Leighton et al. | |
| 6,564,261 B1 | 5/2003 | Gudjonsson et al. | |
| 6,646,997 B1 | 11/2003 | Baxley et al. | |
| 6,657,975 B1 | 12/2003 | Baxley et al. | |
| 6,671,717 B1 | 12/2003 | Shaffer | |
| 6,782,413 B1 | 8/2004 | Loveland | |
| 6,879,565 B2 | 4/2005 | Baxley et al. | |
| 6,885,740 B2 | 4/2005 | Ernstrom et al. | |
| 6,898,273 B2 | 5/2005 | Ernstrom et al. | |
| 6,961,416 B1 | 11/2005 | Summers et al. | |
| 7,054,933 B2 | 5/2006 | Baxley et al. | |
| 7,394,896 B2 | 7/2008 | Norton | |
| 7,460,493 B1 | 12/2008 | Dhanoa et al. | |
| 7,778,206 B2 | 8/2010 | Shaffer et al. | |
| 7,889,660 B2 | 2/2011 | Bugenhagen | |
| 8,060,563 B2 * | 11/2011 | Whynot | H04W 4/029 709/204 |
| 8,068,425 B2 | 11/2011 | Bugenhagen | |
| 8,189,468 B2 | 5/2012 | Bugenhagen | |
| 8,194,643 B2 | 6/2012 | Bugenhagen | |
| 8,229,096 B1 | 7/2012 | Marquis et al. | |
| 8,289,965 B2 | 10/2012 | Bugenhagen et al. | |
| 8,340,083 B2 | 12/2012 | Bugenhagen et al. | |
| 8,364,133 B1 | 1/2013 | Lucey et al. | |
| 8,428,634 B2 | 4/2013 | Schwagmann et al. | |
| 8,467,354 B1 | 6/2013 | Jerkunica | |
| 8,665,758 B1 | 3/2014 | Mateer | |
| 8,666,056 B2 | 3/2014 | Makagon et al. | |
| 8,737,596 B2 | 5/2014 | Kelley et al. | |
| 8,774,383 B1 | 7/2014 | Marquis et al. | |
| 8,798,251 B2 | 8/2014 | Rajagopalan et al. | |
| 2001/0002927 A1 | 6/2001 | Detampel, Jr. et al. | |
| 2002/0075304 A1 | 6/2002 | Thompson et al. | |
| 2002/0076025 A1 | 6/2002 | Liversidge et al. | |
| 2002/0172341 A1 | 11/2002 | Wellner et al. | |
| 2003/0023672 A1 | 1/2003 | Vaysman | |
| 2003/0156697 A1 | 8/2003 | Svercek | |
| 2003/0217174 A1 | 11/2003 | Dorenbosch et al. | |
| 2004/0047460 A1 | 3/2004 | Adams et al. | |
| 2004/0170266 A1 * | 9/2004 | Adams | H04M 3/4931 379/202.01 |
| 2004/0246332 A1 * | 12/2004 | Crouch | H04L 63/104 348/14.08 |
| 2005/0034079 A1 | 2/2005 | Gunasekar | |
| 2005/0058125 A1 | 3/2005 | Mutikainen et al. | |
| 2005/0213517 A1 | 9/2005 | Rodman et al. | |
| 2007/0217589 A1 | 9/2007 | Martin et al. | |
| 2007/0248022 A1 | 10/2007 | Kumar et al. | |
| 2007/0266077 A1 | 11/2007 | Wengrovitz | |
| 2008/0031437 A1 | 2/2008 | Rey | |
| 2008/0049753 A1 | 2/2008 | Heinze et al. | |
| 2008/0063173 A1 | 3/2008 | Sarkar et al. | |
| 2008/0112336 A1 | 5/2008 | Gray | |
| 2008/0159179 A1 | 7/2008 | Shaffer | |
| 2008/0218586 A1 | 9/2008 | Graham et al. | |
| 2008/0253549 A1 | 10/2008 | Loveland | |
| 2009/0019367 A1 | 1/2009 | Cavagnari et al. | |
| 2010/0124321 A1 | 5/2010 | Alexandrov et al. | |
| 2010/0165889 A1 | 7/2010 | Madabhushi et al. | |
| 2010/0169418 A1 | 7/2010 | Whynot et al. | |
| 2010/0275134 A1 | 10/2010 | Baker et al. | |
| 2012/0117153 A1 | 5/2012 | Gunasekar et al. | |
| 2013/0162756 A1 | 6/2013 | Ellison et al. | |
| 2013/0163409 A1 | 6/2013 | Ellison et al. | |
| 2013/0163435 A1 | 6/2013 | Ellison et al. | |
| 2013/0163481 A1 * | 6/2013 | Ellison | H04L 47/15 370/260 |
| 2013/0173706 A1 | 7/2013 | Broadworth et al. | |
| 2013/0335513 A1 | 12/2013 | Broadworth et al. | |
| 2013/0336170 A1 | 12/2013 | Broadworth et al. | |
| 2016/0044068 A1 | 2/2016 | Ellison et al. | |
| 2016/0050078 A1 | 2/2016 | Ellison et al. | |
| 2016/0053997 A1 | 2/2016 | Broadworth et al. | |
| 2016/0057183 A1 | 2/2016 | Broadworth et al. | |
| 2016/0285726 A1 | 9/2016 | Ellison et al. | |
| 2017/0180431 A1 | 6/2017 | Ellison et al. | |
| 2017/0295092 A1 | 10/2017 | Broadworth et al. | |
| 2018/0213011 A1 | 7/2018 | Ellison et al. | |
| 2018/0359180 A1 | 12/2018 | Broadworth et al. | |

OTHER PUBLICATIONS

Canadian Examination Report, dated Oct. 5, 2018, Application No. 2,860,509, filed Jan. 4, 2013; 3 pgs.

European Examination Report, dated Jul. 6, 2016, Application No. 12860103.6, filed Dec. 20, 2012; 7 pgs.

European Examination Report, dated Jul. 7, 2016, Application No. 13733754.9, filed Jan. 4, 2013; 4 pgs.

European Examination Report, dated May 10, 2017, Application No. 12860103.6, filed Dec. 20, 2012; 10 pgs.

Extended European Search Report, dated May 18, 2015, Application No. 12860103.6, filed Dec. 20, 2012; 10 pgs.

Extended European Search Report, dated May 18, 2015, Application No. 13733754.9, filed Jan. 4, 2013; 10 pgs.

International Preliminary Report on Patentability, dated Jul. 8, 2014, Int'l Appl. No. PCT/US13/020244, Int'l Filing Date Jul. 8, 2014; 18 pgs.

International Preliminary Report on Patentability, dated Jun. 24, 2014, Int'l Appl. No. PCT/US12/071018, Int'l Filing Date Dec. 20, 2012; 8 pgs.

International Search Report, dated Apr. 23, 2013, Int'l Appl. No. PCT/US13/020244, Int'l Filing Date Jan. 4, 2013, 5 pgs.

International Search Report, dated Mar. 19, 2013, Int'l Appl. No. PCT/US12/071018, Int'l Filing Date Dec. 20, 2012; 3 pgs.

"Telecommunications and Internet Converged Services and Protocols for Advanced Networking (TISPAN)", Release 2;PSTN/ISDN simulation services: Conference (CONF); Protocol specification;13bTD300 WI03083 Discussion of 3PTY, ETSI Draft; European Telecommuniocations Standards Institute (ETSI), 650, Route des Lucioles; F-06921 Sophia-Antipolis; France; Mar. 20, 2007 , vol. zArchive, No. V0.0.3, pp. 1-20.

Written Opinion of the International Searching Authority, dated Apr. 23, 2013, Int'l Appl. No. PCT/US13/020244, Int'l Filing Date Jan. 4, 2013, 16 pgs.

Written Opinion of the International Searching Authority, dated Mar. 19, 2013, Int'l Appl. No. PCT/US12/071018, Int'l Filing Date Dec. 20, 2012, 5 pgs.

Colbert, Raymond O. et al., "Advanced Services: Changing How We Communicate", *In: Bell Labs Technical Journal* [online], [retrieved on Feb. 11, 2013 (Feb. 11, 2013)] Retrieved from the Internet

(56) References Cited

OTHER PUBLICATIONS

<URL: http://www.herbsleb.org/web-pubs/pdfs/colbert-advanced-2001.pdf>, entire document Jun. 1, 2001, pp. 211-228.

* cited by examiner

ROUTING OF CONFERENCE PARTICIPANT BASED ON CALLER RECOGNITION

TECHNICAL FIELD

Aspects of the present disclosure generally relate to systems and methods that provide for collaboration conferencing with multiple participants using devices connected to a telecommunication network, including a VoIP network, and more specifically for routing a conferencing participant based at least on a received caller identification number.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from a few users to several thousand users communicating on the same telephonic and/or data call.

Typically, conferencing communications require participants to the conference to place a telephonic call to a dedicated conferencing number. Some networks also require the participants enter a conference call code into the keypad of a telephonic device. The conferencing number and code are then utilized by the telecommunications network to connect that participant to a conferencing bridge device. In general, a conferencing bridge is a telecommunications device that hosts the participants of a conferencing communication such that the participants can attend the communication. Thus, the network typically receives the dialed number and conference code from each participant and connects the participant to the conferencing bridge. Once connected to the conference bridge, the participant may take part in the conferencing communication.

It is with these and other issues in mind that various aspects of the present disclosure were developed.

SUMMARY

One implementation of the present disclosure may take the form of a telecommunications network comprising at least one conference bridge and at least one routing device. The at least one routing device is configured to receive a communication from a user of the telecommunications network, the communication comprising a request to access a collaboration conference, obtain an identifier of a communication device associated with the telecommunications network and the user, identify a specific collaboration conference event based on the identifier of the communication device and connect the communication device to the specific collaboration conference event based on the identifier of the communication device Another implementation of the present disclosure may take the form of a system for initiating a collaboration conference in a telecommunications network. The system may include a network interface unit configured to receive a first communication from a user of a communications network to establish a collaboration conference on the network, the first communication received from a communication device associated with the communications network, an application server in communication with the network interface unit and a computer-readable medium connected to the application server configured to store information and instructions. The instructions, when executed by the application server, performs the operations of obtaining an identifier of the first communication device associated with the communications network, the identifier comprising a telephone number of the communication device from which the request is received, associating the identifier with an account of the user, the account configured to associate the identifier and one or more collaboration conference preferences with the user, establishing a specific collaboration conference event based at least on the identifier of the communication device and connecting the communication device to the specific collaboration conference event based at least on the identifier of the communication device.

Yet another implementation of the present disclosure may take the form of method for initiating a collaboration conference in a telecommunications network. The method may comprise the operations of receiving a request message for access to a collaboration conference from a requester's communication device, obtaining an identifier of the requester's communication device, the identifier comprising a telephone number of the requester's communication device from which the request is received and obtained through an Automatic Number Identification (ANI) feature of the communications network and associating the identifier with an account of the requester, the account configured to associate the identifier with the requester. Further, the method may include the operations of initiating a specific collaboration conference event based at least on the identifier of the requester's communication device and connecting the requester's communication device to the specific collaboration conference event based at least on the identifier.

DETAILED DESCRIPTION

Aspects of the present disclosure involve systems, methods, computer program products, and the like, for collaboration conferencing with multiple participants over a communications network, and more specifically for a conferencing system utilizing one or more Internet Protocol (IP)-based telecommunication devices. The term "collaboration conferencing" as used herein includes any type of multimedia conferencing over a network, such as audio conferencing, web or internet conferencing and multi-site video conferencing. In one embodiment, the conferencing system may utilize Session Initiation Protocol (SIP) to route collaboration conferences within the telecommunications network. The SIP-based routing provides for the exchanging of information from one device of the conferencing system to another that is not available in non-IP based conferencing systems. Thus, through the use of IP-based telecommunication devices, the network provides beneficial features for collaboration conferencing.

In addition, aspects of the present disclosure involve systems, methods, computer program products, and the like, for routing one or more requests to join or initiate a collaboration conference based on at least an identifier of a requesting device. In one embodiment, a telecommunications network obtains an identifier, such as the telephone number, of a device requesting to join or initiate a collaboration conference. Obtaining of the telephone number of the requesting device may occur through an Automatic Number Identification (ANI) feature available to some telecommunications networks. The identifying information is then compared to a database of user accounts maintained by the network. In one embodiment, the database may include one or more collaboration conferencing preferences of a user associated with the account. The network may then prompt the user of the requesting device to join a particular conferencing bridge or provide particular conferencing features based on the one or more preferences associated with the user's account. A response to the prompt may be received and then acted upon by the network to connect the requesting device to a collaboration conference and/or provide the one or more conferencing features to the requesting device. In this manner, the network bypasses requesting identification directly from the requesting device and, instead, can route the user to a particular conference based on the user's account information.

Figure 1:
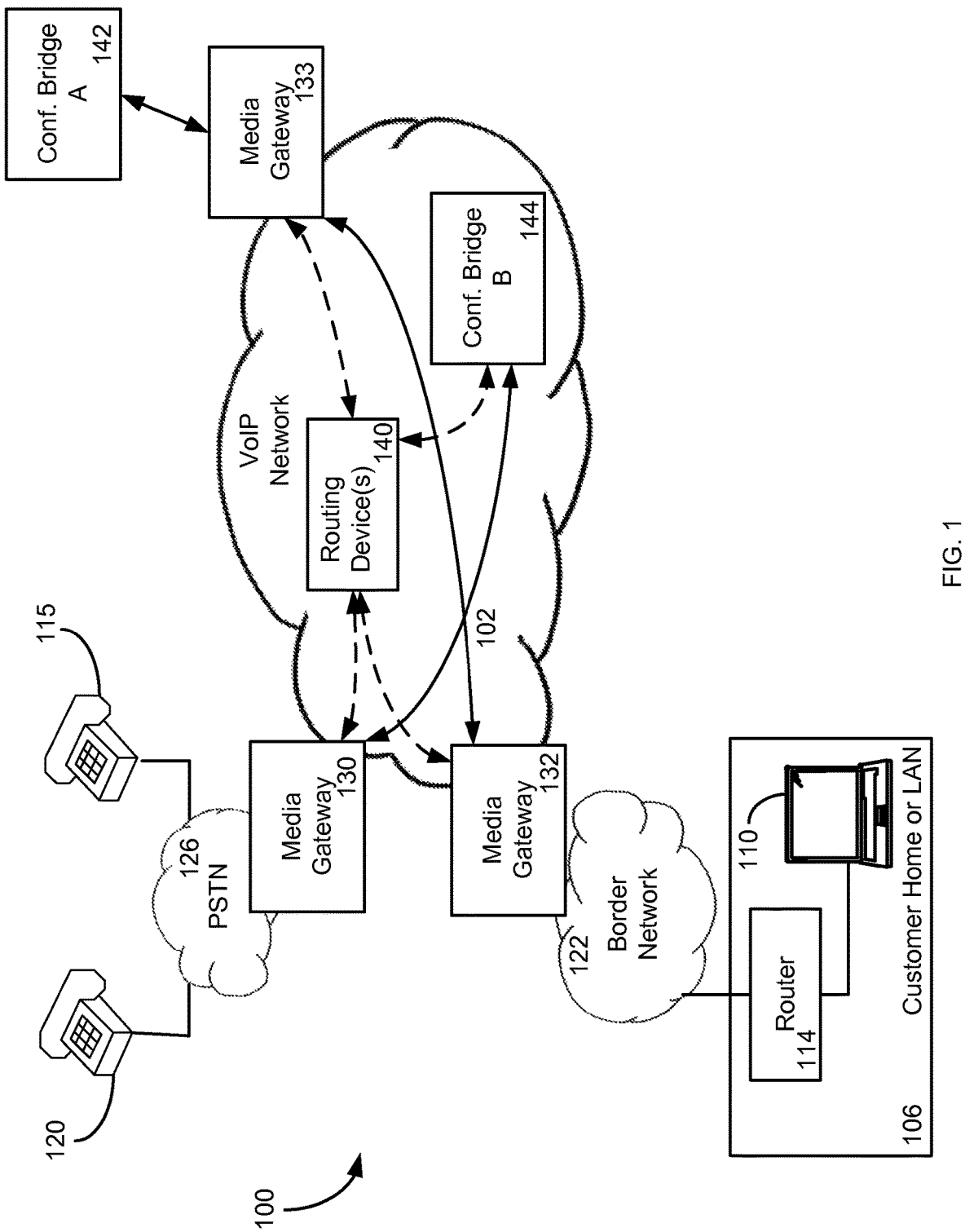
FIG. 1 schematic diagram illustrating an exemplary Voice over Internet Protocol (VoIP) operating environment, including a central conferencing routing server, in accordance with one embodiment.

FIG. 1 illustrates an exemplary operating environment 100 for hosting conference collaboration communications between multiple participants. The environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference, although any type of collaboration conference over a telecommunications network is envisioned with respect to the present disclosure. Similarly, although FIG. 1 illustrates some of the communication devices 115, 120 as telephonic devices, the communication devices may be any type of communication device, including personal computers, cellular phones and the like.

Upon receipt of the request for a collaboration conference, the network 102 routes the request to a routing device 140 or routing devices integrated within the network 102. However, it should be appreciated that the routing device 140 may be a part of the network 102, may be separate from the network, or may have portions deployed in the network and out of the network. In addition, the routing device 140 may be resident on one or more components of the VoIP network 140, including several instances of the routing device 140 integrated throughout the network 140. Further, although only a single instance of a routing device 140 is illustrated in FIG. 1, any number of routing devices may be present in the network 102.

To transmit the request to the network, the requester uses the communication device 110, 115, 120 to enter a conference specific telephone number or access port. The routing device 140 receives the request to begin a collaboration conference or join an existing conference. In response, and described in more detail below, the routing device 140 may route the one or more requests to one of several conference bridges 142, 144 associated with the VoIP network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the VoIP network 102 through which the communications of the conference are transmitted. This configuration is utilized for Internet Protocol (IP) based bridges and is generally described in more detail below.

One particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based devices may utilize many of the advantages of information exchange within the header when communicating with TDM-based network devices.

To connect to a collaboration conference, each participant to the conference may be routed to the same conference bridge 144 for the duration of the conference. The conference bridge 144, in turn, provides communication ports for each participant such that each participant can hear or otherwise participate in the collaboration conference. Any conference bridge known in the art or hereafter developed may be integrated into the system 100 of FIG. 1 for hosting a collaboration conference, including IP-based conference bridges. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

In some instances, the conference bridge 144 or routing device 140, upon receipt of the request to initiate or join a collaboration conference, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below. However, as also explained in more detail below with reference to FIGS. 7 and 8, the network 102 may also be configured to automatically determine an identity of a requesting device and route the requesting device to the conference bridge based at least on the requesting device identity, removing the query to the requester to enter an access code number. In addition, one or more conferencing preferences may also be applied to a collaboration conference based on the identity of the requesting device as determined by the network 102.

Figure 2:
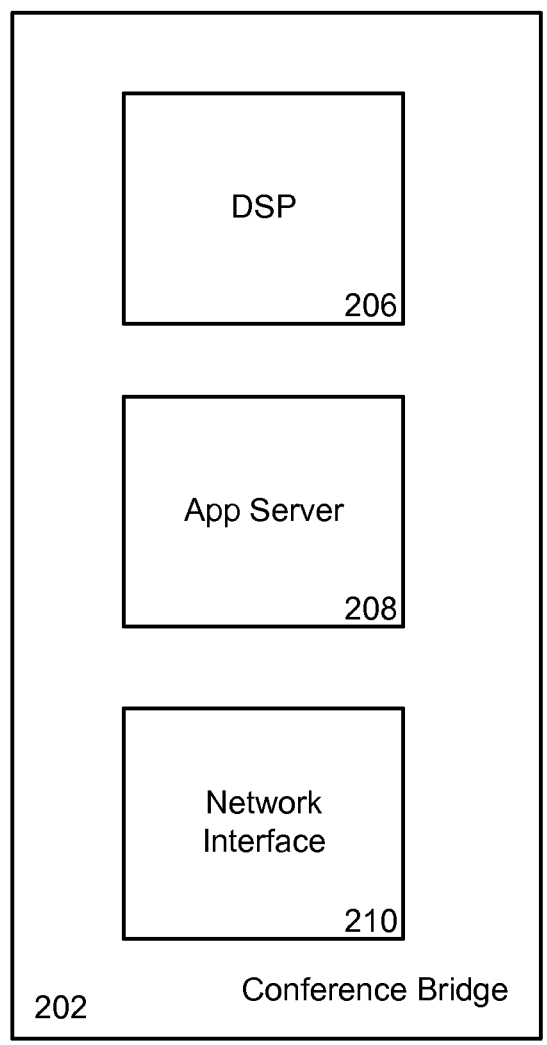
FIG. 2 is a block diagram illustrating a conference bridge configured to host one or more conferencing communications.

FIG. 2 is a block diagram illustrating an exemplary IP-based conference bridge device that may be utilized in the network configuration 100 of FIG. 1. The conference bridge 202 comprises an application server 208 and a digital signal processing (DSP) component 206. In general, the application server 208 of the conference bridge 204 communicates with one or more applications of the network to establish the collaboration conference. In addition, the conference bridge may include a network interface unit 210 that is configured as a proxy between the conference bridge 204 and the network. In general, the application server 208 includes one or more applications that can be executed by the conference bridge 202 to perform many of the functions described herein for the conference bridge. In addition, the network interface unit 210 receives information and/or instructions from the network 202 to route and connect a collaboration conference communication for that particular bridge. The network interface unit 210 connects directly to the core of the network 100 to receive the communications of the participants and connects each participant to each other to establish the collaboration conference. The network interface unit 210 may also initiate one or more of the applications stored in the application server for execution by the conference bridge.

The conference bridge 202 may receive a request from the network to connect a requester with a hosted conference. The request may be received through a signaling protocol, such as through the signal plane of a SIP-based communication. In response, the application server 208 may provision one or more ports for connection to the requester's communication. The app server 208 may then signal to the network 102 that the ports are available, at which point the data or audio portion of the communication may be routed to an available port in the conference bridge 202. In this manner, the handshaking between the network and the conference bridge 202 may occur over the signaling plane of the IP-based protocol separate from the data or audio portion, known as the real-time transport protocol (RTP) plane, of the communication request. A more detailed description of the method through which a request is routed to a conference bridge 202 is included below with reference to FIG. 3.

In a SIP-based implementation of the network 102 and conference bridge 144, the routing of the request to the conference bridge may include the transmission of one or more SIP-based commands, with each command including a header with information concerning the routing of the request. For example, the network 102 may route a request to the routing device 140. In one particular embodiment, the request is a SIP-based command and includes an identifier of the requester in the header portion of the command. The requester identifier may be any character based identifier, including telephone number, name of the requester, name of a group of company associated with the requester, or other identifier. In response, the routing device 140 selects a conference bridge that is hosting or will host the collaboration conference identified in the request. The routing device 140 then issues a SIP refer command to route the request from the ingress network of the requester to the selected conference bridge. The SIP refer command may include, among other information, an identification of the conference bridge in the header of the command. In response, the network then routes the requester's request to the conference bridge for connection to the collaboration conference. The operation of the routing device 140 and the conference bridge 144 are described in more detail in relation to FIG. 3.

Figure 3:
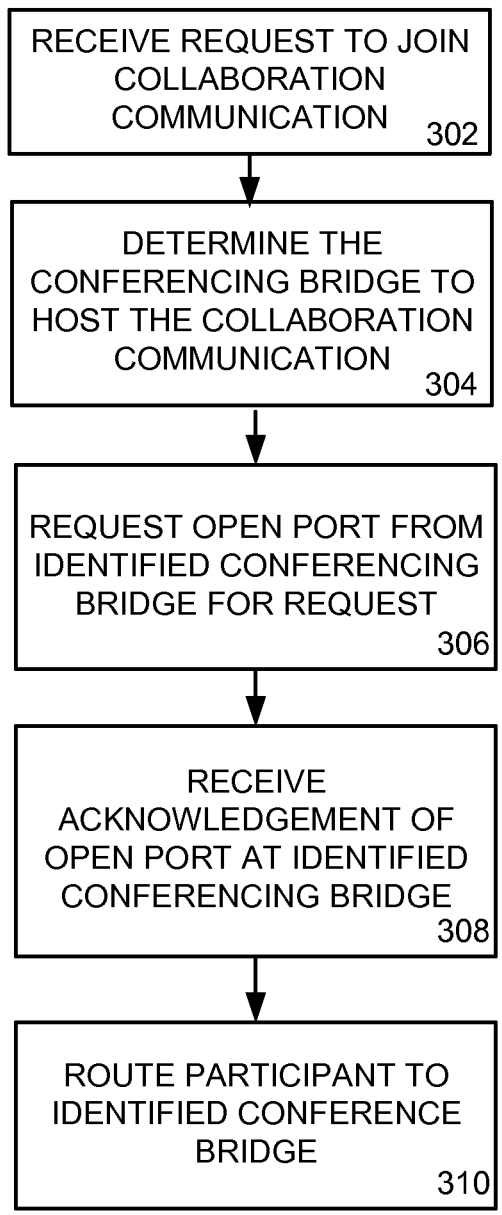
FIG. 3 is a flowchart of a method for the conferencing routing server of the network of FIG. 1 to receive a request from one or more participants to join a collaboration session and route the participants to the proper conference bridge.

In this manner, the network 100 may be utilized by one or more participants to a collaboration or conferencing communication hosted on a conference bridge 142, 144. In particular, FIG. 3 is a flowchart of a method for the routing device 140 of the network 102 to receive a request from one or more participants to join a collaboration session and route the participants to the proper conference bridge 142, 144 through which the collaboration is hosted. In general, the operations described in relation to the flowchart of FIG. 3 are performed by one or more components of the routing device 140 as part of the telecommunications network 102.

Beginning with operation 302, a participant to a conference communication may dial into or otherwise contact the network to join the conference using a communication device 110, 115 and/or 120. For example, in one embodiment, the participant may dial a conference number and/or enter a conference code to access the collaboration conference. In another embodiment, the participant dials into the network utilizing a communication device 110, 115 and/or 120 and, based on the telephone number or other identifying feature of the communication device, the network routes the participant to the collaboration conference. In general, the media gateway 130, 132 or other switching device routes the request from the participant to the routing device 140 through the network 102. In FIG. 1, the request is illustrated by the dashed line between the media gateway 130, 132 and the routing device 140. As should be appreciated, in some IP networks, the request may be a SIP-based command routed to the routing device 140 on a signaling plane and does not include the audio portion of the communication. The request is then received by the routing device 140, as indicated by operation 302 of FIG. 3.

Upon receipt, the routing device 140 determines, in operation 304, which of the available conference bridges 142, 144 associated with the network 102 that is hosting or will host the collaboration conference requested by the participant. The routing device 140 may utilize several factors to determine which conference bridge 142, 144 hosts the collaboration conference. For example, the routing device 140 may utilize an identifier of a requesting device to route the participant to a conference bridge 142, 144. In addition, the routing device 140 may communicate with one or more of the conference bridges 142, 144 associated with the network 102 in operation 304. This communication between the routing device 140 and the conference bridges is illustrated by the dashed lines between the routing device and the conference bridges in FIG. 1. Further, in the embodiment in which the conference bridge 144 is within the network 100, the routing device 140 would communicate directly with the conference bridge without going through a media gateway device 133.

In one embodiment, the routing device 140 communicates particularly with the app server component 208 of the conference bridge 202 to determine the appropriate collaboration bridge and to establish the collaboration conference. The app server component 208 of the conference bridge 202 may provide any information concerning the conference bridge to the routing device 140, including number and types of available ports, the technical capabilities of the conference bridge, current collaboration conferences being hosted by the conference bridge, and the like. In the SIP-based conference bridge embodiment, the routing device 140 would communicate with the app server 208 through the network interface unit 210. The app server 208 then provisions the requested ports and notifies the routing device 140 when such ports are available for the collaboration conference. In addition, the app server 208 provides the information of the conference bridge 144 that may be utilized by the routing device 140 to determine which conference bridge will host the collaboration conference.

In operation 306, the routing device 140 requests an open communication port from the conference bridge 144 identified in operation 302. In the embodiment shown in FIG. 2, the conference bridge 202 may utilize a port in the DSP component 206 of the conference bridge in response to the request sent by the routing device 140. The open port in the DSP component 206 allows the participant to connect to the collaboration conference hosted by the conference bridge 202 and participate in the conference. In addition, the conference bridge 202 may transmit an acknowledgement to the routing device 140 from which the request originated to indicate that the requested communication is open. Again, in IP-based networks, the request for available ports and acknowledgement may occur on a separate communication signal than the audio or video portion of the collaboration communication. Further, a SIP-based network, the request may include certain information in the header of the request, such as the master ID number and/or the number of requested ports. The request made by the routing device 140 to the conference bridge is illustrated in FIG. 1 as the dashed line from the routing device to the media gateways associated with each conference bridge.

In operation 308, the routing device 140 receives the acknowledgement message from the conference bridge 144. In one embodiment, the acknowledgement message contains information that identifies the open port to the routing device 140. For example, in the SIP-based embodiment, the acknowledgment may include the IP address of the conference bridge in the header of the message. In response to receiving the acknowledgement message, the routing device 140 routes the participant's communication to the open port in the conferencing bridge 144 in operation 310. In one embodiment, the routing device 140 facilitates the communication to the conference bridge 144 such that the audio portion of the communication from the participant is no longer routed through the routing device. For example, in a network 102 that utilizes Session Initiation Protocol (SIP), the routing device 140 may issue a "SIP Refer" command to route the participant communication to the conference bridge 144, effectively removing the routing device from the communication flow. This refer message may include the IP address of the selected conference bridge in the header such that the network can route the communication to the selected conference bridge. The connection of the communication bypassing the routing device is illustrated in FIG. 1 as the solid line connecting the media gateway 130 associated with the participant's telephonic device 120 and the media gateway associated with conference bridge 144. Thus, through the use of the method outlined in FIG. 3, the routing device 140 may receive a request from a participant of a collaboration conference and route the participant to the proper conference bridge that hosts the specific collaboration conference. In a similar manner, collaboration conference participants may be routed to media gateway 133 and conference bridge A 142 such that multiple conferences may be occurring simultaneously through the network 102 on multiple conferencing bridges 142, 144.

Figure 4:
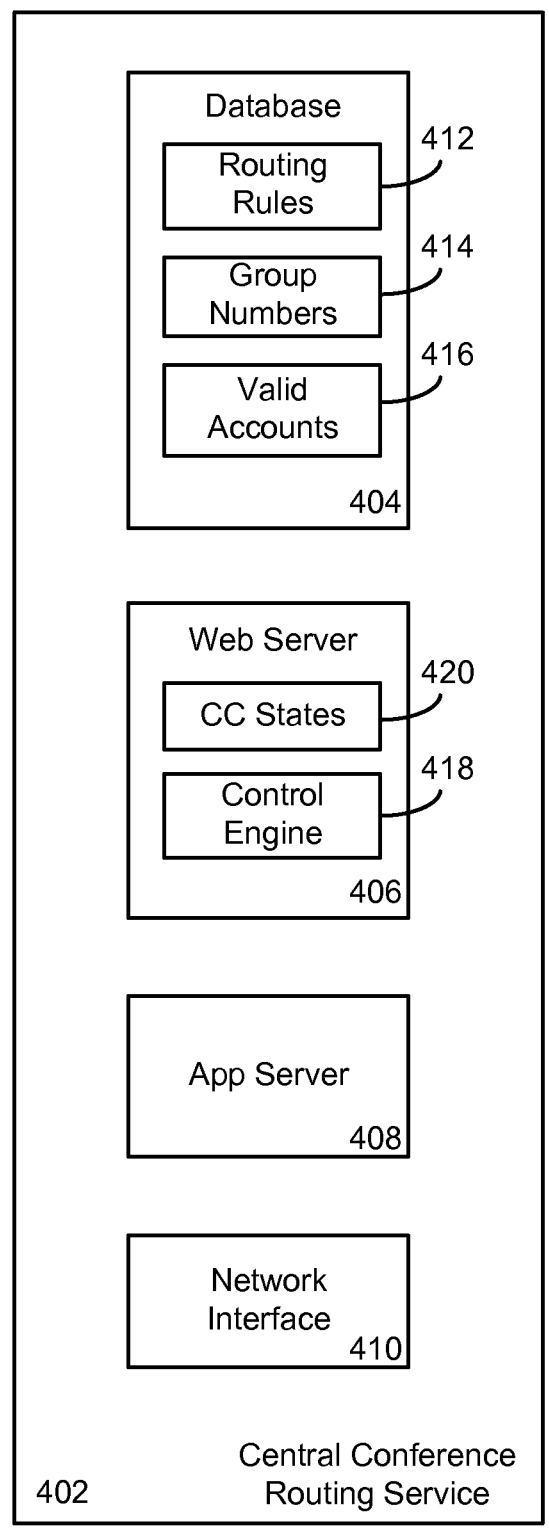
FIG. 4 is a block diagram illustrating several components of a central conferencing routing server.

FIG. 4 is a block diagram illustrating several components of a routing device 140 that may be implemented on the network 100 of FIG. 1. In one embodiment, the routing device 140 of FIG. 4 may be referred to as a Central Conferencing Routing Server (CCRS) as part of a telecommunication network. The components outlined may be implemented by one or more processors executing one or more computer instructions stored in a computer-readable medium. Examples of systems that may execute or implement the components are provided below with reference to FIG. 6. Also, as mentioned above, the components of the routing device 140 may be located on any number of computing devices within the network, on any number of computing devices outside of the network, and/or a combination of both.

The routing device 402 may include a database 404 configured to store information concerning an associated network, one or more customers or users of the network 416, identification numbers 414, and/or any other information useful by the routing device in routing, billing, load balancing, disaster recover and the like for collaboration conferencing communications. For example, the database 404 may store identification numbers 414 for individuals or groups of users to the network who have access to a collaboration conference feature. Associated with the identification numbers may be one or more telephone numbers, access codes, communication device identifications, master identifications and routing rules associated with the users. In addition, the database 404 may store one or more conferencing preferences associated with one or more accounts that may aid the routing device 402 in determining a conference bridge and/or one or more conferencing features to apply to a collaboration conference based on an identifier of a requesting device. The database 404 may also store information associated with the routing 412 and handling of collaboration conferencing, such as accepted communication devices, welcoming messages and operational rules for conducting the collaboration conference. In general, any information that may be utilized by the routing device to route a collaboration communication and conduct the collaboration conference may be stored in one or more databases associated with the routing device.

The routing device also includes a web server 406 or web application that utilizes one or more applications stored in an application server 408 to execute the one or more applications. For example, the web server 406 may include one or more application programming interfaces (APIs) that execute any number of stored applications to perform the operations described herein. The web server 406 may also enable the provisioning of the databases 404 of the routing device by the application server 408. In addition, the routing device may include a network interface unit 410 as a proxy for receiving any type of information and/or instructions from the network 102 to route the communication. The network interface unit 410 may also initiate one or more of the applications stored in the application server or database for execution by the routing device and/or receive a request from the telecommunications network to initiate a collaboration conference.

Through the use of the described components, the routing device 402 provides added flexibility and features to collaboration conferencing not previously available. For example, because each collaboration conference request is routed through the routing device or system of routing devices, routing rules may be applied to a block of related requesters identified by a master ID number or customer number, removing the need to update the routing rules for each member associated with the master ID or customer number. In addition, the database 404 of the routing device 402 may maintain a control engine or state of a particular routing device that determines which conference bridge a collaboration conference occurs.

Figure 3B:
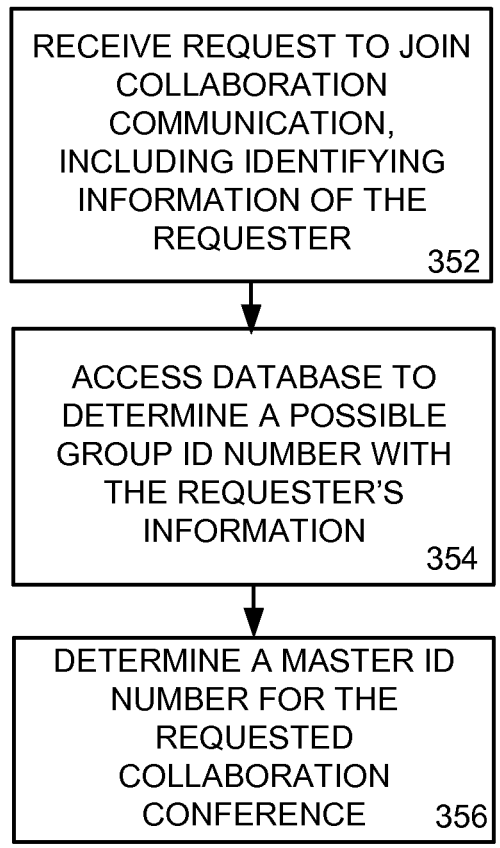
FIG. 3B is a flowchart illustrating a method for a central conferencing routing server to receive a request for a collaboration conference and associating a master identification number to the collaboration conference.

In one embodiment, the routing device 402 may perform the operations of the flowchart of FIG. 3B. In particular, the routing device 402 receives a request to establish a collaboration conference at the network interface 410 in operation 352. The request may include information concerning the requestor, such as requestor's telephone number and access code number. However, although the operations of FIG. 3B are described in reference to the request comprising the requestor's telephone phone number and access code number, this is but one example of the information used by the routing device to identify the requester. For example, the request may include an identification of the requester's communication device in the request header, such as a text string of the requester's personal computer. In another example, the requester's name may be used as the identifier of the requester in the request. Thus, any operation described herein utilizing the requester's telephone number and access code may be applied to other information contained in the request. For ease of instruction, however, the example of the telephone number and access code number is used.

Upon receiving the request, the application server 408, in concert with the web server 406, utilizes the requestor's telephone number and access code number to possibly determine a group ID number for the requester in operation 354. In particular, with the requester's information, the application server 408 accesses a lookup table stored in the database 404 to match the telephone number and code access number to the group ID number. In some instances, it is advantageous to associate a group ID number to a group of users of the collaboration conference system. For example, through the group ID, one or more routing rules may be applied to the entire group without the need to provide a routing rule for each individual member of the group. In some instances, the group ID number may be associated with a customer ID number such that each member associated with a customer ID number is given the same group ID number and alterations to the customer's account with the network can be applied to each group member through alterations to routing rules associated with the group ID number.

In operation 356, the application server 356 may also associate a master ID reference or number to the collaboration conference request and stores the master ID reference or number in the database 404. The master ID reference or number is utilized by the network to track the collaboration conference and the participants to the conference and may be associated with the requester's information. With the master ID number associated with the request, the application server 408 again accesses the database 404 to determine a state of the collaboration conference. In general, if the collaboration conference has been established on a conference bridge (such that the requester is a participant to the collaboration conference and not the initiator), the database 404 includes an identification of the conference bridge on which the collaboration conferencing is hosted. Alternatively, if the request is to initiate a new collaboration conference, the database includes a notification the request is a request for a new collaboration conference, at which point the application server routes the request to a master CCRS device that executes a master control engine application to determine which conference bridge will host the conference. In this manner, the components of the CCRS 402 receive the request to join or initiate a collaboration conference and route the request to the proper conference bridge.

As mentioned above, the database 404 may include a subscriber information table 414 that associates information of the requester (such as a telephone number, access code number or other identification or reference of a requestor) to a group ID number for the routing device system. Thus, several different requester references can be associated with the same group ID number, such as a customer number. In addition, one or more routing rules 412 can be associated with a group ID number in the database 404. For example, one routing rule 412 may restrict all collaboration conferences for a particular group ID number to a particular conference bridge. This removes the need to manually change the routing rules for each individual requester for all of the members of a particular group ID number. Further, the database 404 of the routing device 402 may be utilized by a control engine 418 of the routing device system to store information 416 utilized by the control engine, such as associating a master ID number of a collaboration conference with an ID of the conference bridge on which the conference is hosted, the status of a collaboration conference 420, the start time of the collaboration conference, the participant count of the conference, the maximum number of participants that have attended the particular conference, and the like. In general, the database 404 may include any information concerning collaboration conferences hosted by the telecommunications network.

Figure 5:
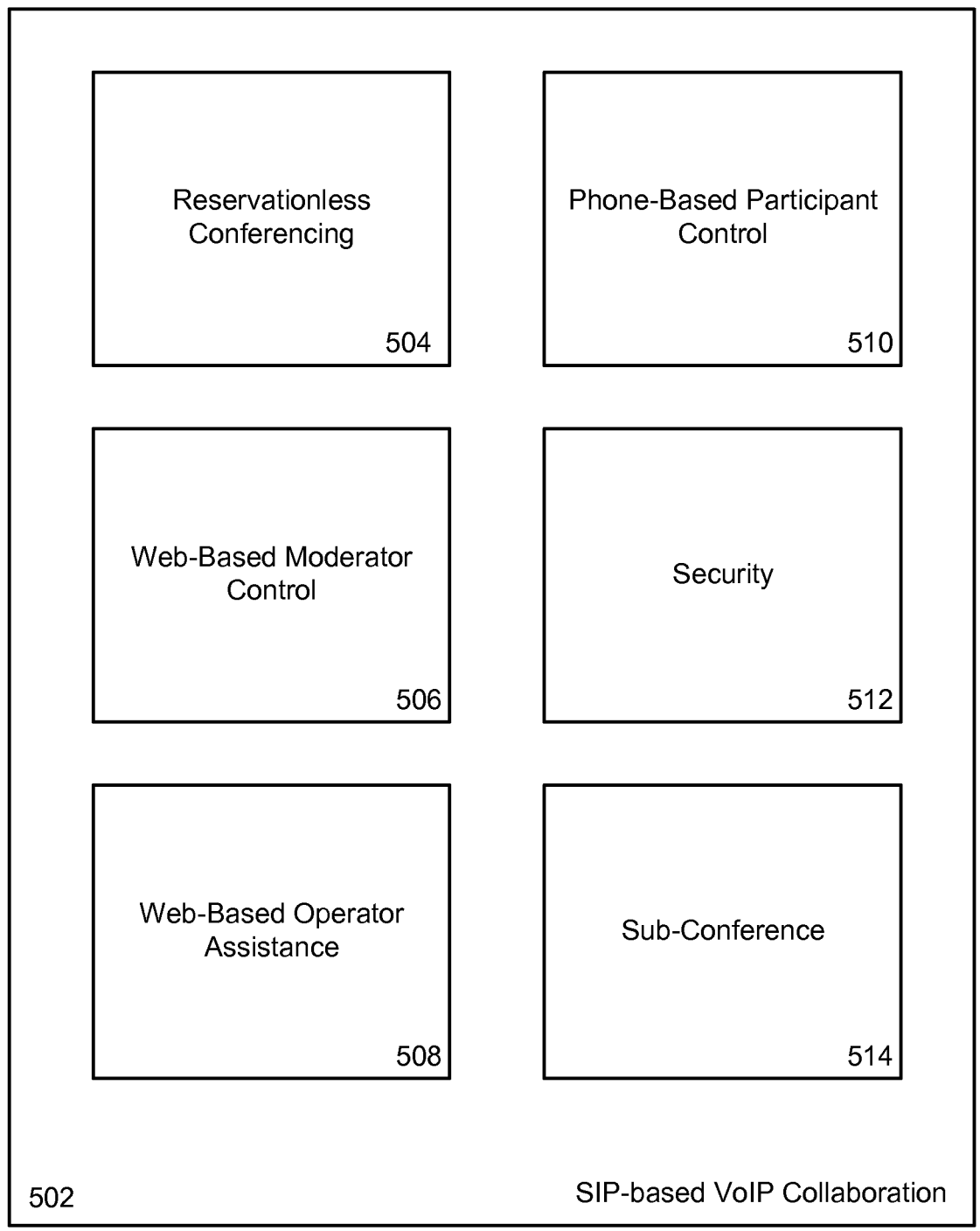
FIG. 5 is a block diagram illustrating features of an IP-based conference bridge for collaboration conferences hosted by the conference bridge.

The use of the SIP-based conference bridge 144, and in particular through the capability to pass information in a header of the SIP-based command, provides several advantages related to collaboration conferencing in a telecommunications network. Some of such features of the SIP-based conference bridge 502 are illustrated in FIG. 5. For example, the conference bridge 502 may provide reservationless conferencing 504 between the multiple users of the system. This feature enables users to set up collaboration conferences dynamically such that the session is "always on" or available. This may remove the need to establish a new session whenever a new collaboration conference is desired. Similarly, the SIP-based collaboration conferencing allows for switching from one conference to another without the necessity of establishing a new session. In particular, because the SIP-based commands may contain an identification of the requester in the header portion of the command, the requester's communication through the network is not necessarily tied to a dialed number. Rather, the header identifier in a SIP-reinivite command allows the requester to be shuttled between destination conferences as identified within the header of the SIP-based commands.

Another feature provided by the SIP-based collaboration conference bridge 502 includes a web-based moderator control 506, generally through a graphical user interface (GUI) accessed through the moderators computer. The moderator control 506 may allow a moderator of a collaboration session to control several features and the overall flow of the collaboration session. For example, the control 506 may provide information on the participants to the session, may allow the moderator to control the features available to which participant, establish a chairperson to the collaboration, control the view that each participant sees on their respective computers, mute one or more participants, disconnect one or more participants, etc. This feature is possible with the SIP-based conference bridge as an identifier of the collaboration conference can be passed in the header portion of the SIP command. Thus, the audio and/or video packets can be tied to or otherwise associated with the web-based packets such that the collaboration conference can include a web-based moderator control in a manner that provides association between the various parts of the collaboration conference.

Similarly, the SIP-based conference bridge 502 may allow for sub-conferencing 514 accessed and activated through the moderator control 506. Sub-conferencing 514 allows for the creation of one or more smaller collaborations from the participants of a larger collaboration. This feature may be activated by the moderator through the moderator control 506 or by a user through another control feature. In general, any configurable feature or information of the collaboration process may be made available to the moderator, and controlled, through the web-based moderator control 506. Similarly, the conference bridge 502 may provide a web-based operator assistance tool 508 that provides aid and technical support to moderators or users of the IP-based collaboration tool. Also, the SIP-based conference bridge 502 may include a phone-based participant control feature. This feature may be similar in use to the dual-tone multi-frequency (DTMF) signaling of traditional non-IP based conference bridge that allow a participant to press one or more buttons on the participant's phone to control aspects of the collaboration conference.

In addition, SIP-based conference bridges 502 provide high definition audio and video signals 510 for increased quality of collaboration conferences. In general, IP-based telecommunication devices have the capability of higher quality audio and video transmission such that high definition audio and video signals may be provided by the SIP-based conference bridge 502.

Security 512 measures may also be provided in the SIP-based conference bridge 502. Such security may allow for support for law enforcement requirements under the Commission on Accreditation for Law Enforcement Agencies (CALEA) guidelines. Additionally, the collaboration tool 502 may include fraud monitoring, encryption of command messages and control to ensure proper use of the conference bridge.

In addition to the additional features a SIP-based conference bridge 502 provides, the use of SIP commands may also be used to transmit information concerning one or more collaboration conferences to aid in the establishing and hosting of the conferences. For example, identification of the participants to a collaboration conference may be included in the header portion of a SIP command. Other information includes a conference identifier, the role of a requester (moderator or participant) and other information to aid in transmission of the multimedia signals of the conference.

Figure 6:
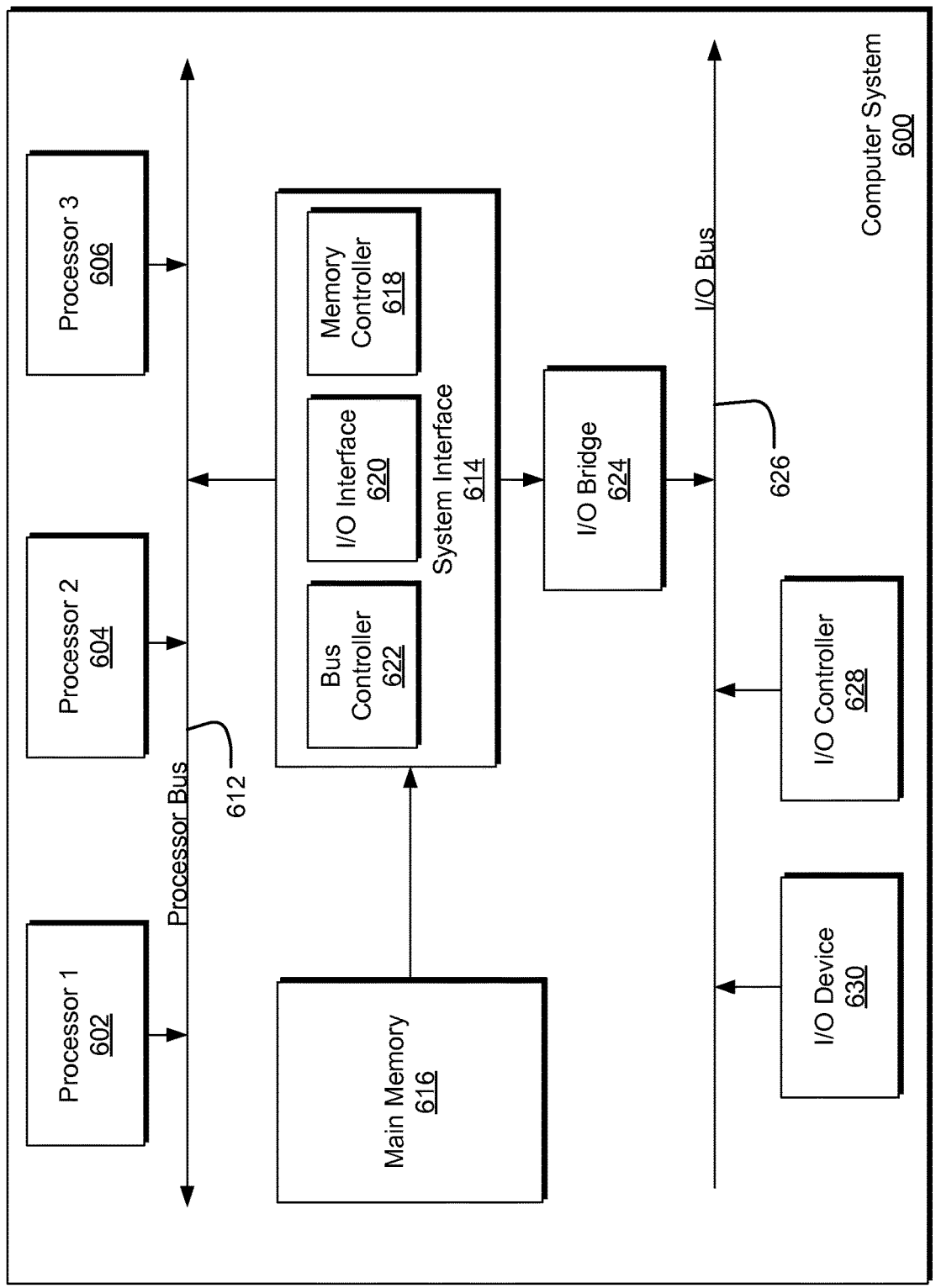
FIG. 6 is a diagram illustrating an example of a computing system which may be used in implementing embodiments of the present disclosure.

FIG. 6 is a block diagram illustrating an example of a computing device or computer system 600 which may be used in implementing embodiments of the present invention. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. Processors 602-606 may also be purpose built for processing/mixing media data, such as audio or video components of a media stream, such as a digital switch processor. System interface 614 may be connected to the processor bus 612 to interface other components of the system 600 with the processor bus 612. For example, system interface 614 may include a memory controller 616 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 660, as illustrated.

I/O device 660 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

As described, by utilizing one or more of the embodiments described above, the routing device system may route a collaboration conference communication to an appropriate conference bridge based on any number of preferences or information about the requester and/or communication network. In one example, the routing device may employ one or more control or state engines that monitor or maintain a status of the collaboration conferences occurring over the network. The control engines maintain information about each collaboration conference, such as a master identification number for the conference, a status (such as active, inactive, temporary, or unknown), the conference bridge on which the conference is hosted, a start time for the conference, a participant count, a maximum participant count and a stop time for the conference, among other information. In general, the control engines may obtain or receive any information about the conference and maintain a record of the information for use by the routing device system. As such, each control engine in the routing device may be connected to or otherwise associated with the conference bridges associated with the communications network to provide and receive information concerning the collaboration conferences of the network. In one embodiment, the control engines may be an application executed by the application server 408 with the information or data stored in the database 404. The operation of the control engine in relation to the routing device is described in more detail in U.S. Nonprovisional application Ser. No. 13/708,659 titled "METHOD FOR ROUTING IN A CENTRAL CONFERENCING ROUTING SERVER," which is hereby incorporated by reference herein.

The routing device may utilize the information maintained by the control engines to perform several of the functions related to the routing of conference communications described above. For example, a request received by the routing device to join an existing collaboration conference may be routed to the correct conference bridge by referring to the information stored by the control engines. As mentioned above, the control engines maintain a status of each conference and the conference bridge on which the conference occurs. With this information, the routing device may appropriately route any additional participants to the correct conference bridge. Such information may also aid in routing requests for a new collaboration conference to a suitable conference bridge, including based on network performance and user preferences.

In one embodiment described above, the routing device routes the conference request to a conference bridge by requesting the conference bridge for an available port on the bridge. If the conference request is a request to establish a collaboration conference, the request may be for a plurality of available ports to host the conference. The allocation of available ports associated with the conference bridge for hosting the conference may be handled by a request from the routing device or by a control server associated with the conference bridge. In either case, available ports of the conference bridge may be made available in response to the conference request. In other embodiments, selection of a conference bridge may be accomplished using domain name system (DNS) resolution techniques, such as round-robin selection or intelligent algorithms that take into location and/or proximity considerations (e.g., Anycast), load on the bridges, popularity or any other known policy. Such techniques may either replace or supplement the routing protocols as part of the conference bridge selection process.

As mentioned above, the routing device system may include a plurality of routing devices or control engines executing on several application servers. As such, the network may determine a master control engine application to be executed on one of the routing devices that is tasked with routing new collaboration conference requests. In one embodiment, the master control engine may be determined by connection criteria. For example, each control engine of the routing devices may maintain a total number of bridges that are connected to all of the control engines with which the local control engine is communicating. In this embodiment, the control engine that sees the highest total number of bridges is selected as the master control engine and handles all collaboration conference requests. However, if more than one control engine sees the highest total number of bridge connections, the control engine with the highest number of local connections between the control engines with the highest total number is selected as the master control engine. If no single control engine is selected by the first two criteria, than a prioritized system ID may be employed to select the master control engine. It should be appreciated that this is but one example of a method for selecting the master control engine and any method to select a master control engine from the operating control engines may be employed. The use of a master control engine to determine which conference bridge a new collaboration conference is established may aid in preventing a split conference being established on multiple bridges. Additionally, any control engine of the routing device may act as the master control engine based on any criteria, including the example mentioned above. Some delay may be incorporated into the switching the master control engine from one engine to another to prevent bouncing from one engine to another rapidly.

In addition to the master control engine feature, the routing device system may also incorporate a priority table or list into a decision process when determining which conference bridge to host the collaboration conference. The information or data within the priority table may be stored in one or more databases of the routing device. In general, the priority list is associated with a customer number or other identifying number of a requester that lists one or more conference bridges that may host a collaboration conference and a priority associated with each conference bridge in the list. For example, the priority list for one customer may include three conference bridges ranked in order by the highest priority to the lower priority. In some embodiments, a plurality of conference bridges may be grouped into a single priority group. Upon receipt of a request for a collaboration conference, the master control engine may identify the requester, access the priority list associated with the requester and select a conference bridge based on the priority list. As discussed in more detail below, the priority of the conference bridges for any requester may be based on several criteria. The operation of the load balancing and priority routing in relation to the routing device is described in more detail in U.S. Nonprovisional application Ser. No. 13/708,678 titled "LOAD BALANCING IN A CENTRAL CONFERENCING ROUTING SERVER," which is hereby incorporated by reference herein.

In one example of such criteria, one or more conference bridges may be assigned a higher priority based on the geographical location of the conference bridge. For various reasons, a conference bridge located in a particular area may be preferable for hosting a collaboration conference from a particular requester. For example, a conference bridge located nearer the requester may be preferable to one located a far distance as the connection speed and clarity may be improved for a conference bridge located nearer the requester. In this situation, the priority list for that requester may be updated or created to provide priority to the conference bridge near the requester such that, upon determining which conference bridge to host the collaboration conference, the master state engine may first consider the higher prioritized bridge.

Similarly, a higher priority may be given to a conference bridge that provides additionally requested features for the collaboration conference. For example, the customer to the network may request a collaboration conference occur in wideband audio or other features that require an IP-based conference bridge. In this situation, an IP-based conference bridge may be given a higher priority than non-IP-based conference bridges in an attempt to meet the requests of the requester. Other priority criteria may be the size or other network requirements of the conference. For example, a requester may routinely request a high volume conference such that the routing device may associate a conference bridge that handles larger conferences (conferences with more participants) a higher priority for that particular requester. In general, however, any information or criteria may be considered when the routing device prepares the priority list associated with a requester.

Another advantage that the priority list provides is in the situation when a conference bridge is placed offline or suffers a failure. For example, a scheduled maintenance on one of the conference bridges may be desired by a network administrator. Thus, conferences currently being hosted on the conference bridge for repair may be maintained by the routing device, but new conferences may be directed to other conference bridges in an effort to remove the conferences from the selected conference bridge. To accomplish this, the routing device may remove the selected conference bridge from the priority lists for each requester. Thus, when a request is received and the routing device consults the priority list for the requester, the selected bridge is not an available option. However, the master control engine may continue to direct requests for ongoing conferences to the proper conference bridge. The operation of disaster recovery in relation to the routing device is described in more detail in U.S. Nonprovisional application Ser. No. 13/708,689 titled "DISASTER RECOVERY WITH A CENTRAL CONFERENCING ROUTING SERVER," which is hereby incorporated by reference herein.

The routing device may perform a similar operation when a conference bridge enters a failure state. In this situation, the failed bridge may be removed from the priority list for each requester. In addition, all requests received by the routing device to join an existing conference may be sent to another conference bridge. However, this may create a situation where a conference is split between two conference bridges. In this situation, the routing device may generate a notice to a network administrator of the potential for a split conference so that the administrator may direct each participant of the split conference to a single, operating conference bridge. In some embodiments, the recovery of a split conference into a united conference may be performed automatically by the routing device upon detection. In addition, upon bringing the failed bridge back online, the routing device may throttle the conferences placed on the bridge to prevent an overload of the bridge.

The routing device includes other features that may aid the network in transmitting collaboration conferences. For example, one embodiment of the routing device may route an internet or web connection that is associated with the collaboration conference to the same conference bridge that hosts the conference to maintain continuity between the related web application and the conference. Further, the routing device may maintain a list of technical capabilities of each conference bridge to ensure that particular technical requests are met. For example, one of the conference bridges may operate using SIP or another IP-type protocol. Such conference bridges provide additional technical features over traditional TDM based conference bridges, such as high definition audio, video and audio combination and the like. Thus, in response to a request for a collaboration conference to include particular technical features, the routing device may route the collaboration conference to a conference bridge that supports the technical features of the conference.

Figure 7:
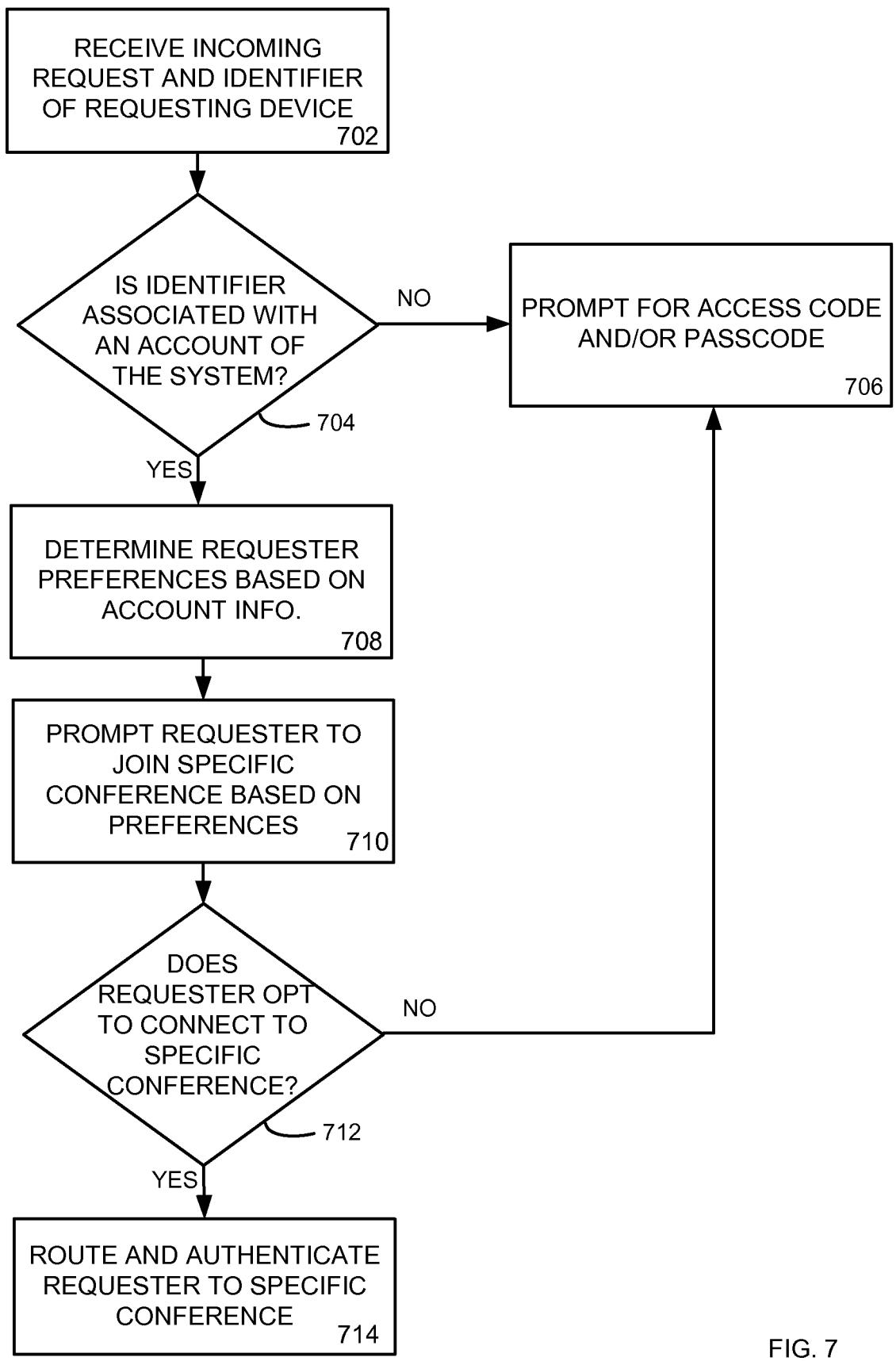
FIG. 7 is a flowchart of a method for a telecommunications network to route a request to join a collaboration session based at least on an identifier of the requesting device.

In one particular embodiment of the present disclosure, the telecommunications network, more particularly a routing device within the network, obtains an identifier of a device requesting to join a collaboration conference and routes the device to a conference based at least on the identifier. FIG. 7 is a flowchart of a method for a telecommunications network to route a request to join a collaboration session based at least on an identifier of the requesting device. Although described below as being performed by a routing device within the network, the operations may be performed by any component or series of components of a telecommunications network. For example, the operations may also be performed by a conferencing bridge of or associated with the network.

In operation 702, the routing device receives an incoming request to join a collaboration conference from a communication device of the telecommunications network. The request to join a conference is similar to those described above with reference to FIGS. 3A and 3B. In addition, some telecommunication networks include a feature that allows the network to identify a communication device that transmits a request to the network. For example, a network may include an Automatic Number Identification (ANI) feature that includes an identifier of a communication device (such as a telephone number) when a call is transmitted to the network. This feature may allow a subscriber to the feature to obtain the telephone number of a calling party. Similar features that allow identification of a calling device include a Dialed Number Identification Service (DNIS) and Calling Line Identification (CLI).

In addition to receiving the incoming request, the routing device also obtains an identifier of the requesting device in operation 702. Thus, in one example, the routing device obtains the telephone number of the requesting device utilizing the ANI feature of the network. Although the examples described herein use the telephone number of the requesting device, in general any identifier of the requesting device may be used. For example, a text string included in a header from the requesting device may also be used to identify the requesting device. Any such type of identifier of the requesting device may be used in the operations described below.

In operation 704, the routing device determines if the obtained identifier is associated with an account of the conferencing system. In one instance, a participant to the conferencing system may not have an account with the system, but instead may be joining a conference that is set up by someone with an account. In such cases, the routing device then prompts the caller for an access code and/or passcode in operation 706, as described above. Operation 706 is one embodiment discussed above with reference to FIGS. 3A and 3B. However, if the routing device associates the obtained identifier with an account in the conferencing system, the operation of prompting the requester for an access code and/or passcode may be bypassed.

To determine if the obtained identifier is associated with an account, the routing device may access a database of accounts associated with the conferencing system. The accounts stored in the database may include a telephone number or other identifier associated with the account. For example, one or more of the accounts may associate a primary telephone number of a requester, such as a cellular telephone number of work telephone number of the requester with the account of that requester. Any number of identifiers may be associated with a particular account, such that a user's home telephone number, cellular telephone number, work telephone number, computer ID and the like that may aid in identifier a user of the conferencing system. Thus, when an identifier is obtained, the routing device may compare the received identifier to the identifiers stored in the database to attempt to associate the identifier with an account and/or user of the conferencing system.

In addition to the identifiers, one or more conferencing preferences may be associated with an account in the database. For example, a user associated with the account may prefer to be the chairperson when joining a collaboration conference. Other service preferences may also be associated with the account, such as a quality of service, high-definition audio and/or video, conference bridge location, number of allowed participants of a conference, and the like. In general, any feature, option or selection available for a collaboration conference can be a preference associated with an account and stored in the database.

The information associated with any account of the conferencing system and stored in the database may be collected or gathered by the routing device or network in any manner. For example, in one embodiment illustrated in FIG. 8 and discussed in more detail below, one or more users of the collaboration conference system may provide the identifying information and/or conferencing preferences directly to the network, such as through a website or other user interface. In another embodiment also discussed in more detail below, the network may be configured to collect preferences, selections and options associated with a user during one or more collaboration conferences in which the user takes part. In yet another embodiment, the network may interact or otherwise communicate with one or more programs utilized by the user to determine the user's preferences. Regardless of the method by which the account information is gathered or obtained, such information may be stored in a database accessible by the network in determining the routing of a participant to a collaboration conference hosted by the network.

In operation 710, the routing device of the network prompts to the requesting device to determine whether the requester wishes to join a specific collaboration conference based on the account and preferences associated with the account. In one example, the routing device may identify a particular user based on the telephone number of the requesting device and prompt the user, perhaps through a message provided to the requesting device, to select whether the user prefers to join a conference set up by the user or to join another conference. Such an example may arise in a networking system that does not store preferences with the account, only an identifier of the requesting device. Through this identification, the system may determine a particular user of the system and suggest to connect that user to a conference in the user's own account. In an embodiment where preferences are stored in the database and utilized when prompting the user is discussed in more detail below.

Continuing the example of utilizing the identifying information of the requesting device to prompt the user, the routing device receives the user's response in operation 712 and determines whether the user selects to join a collaboration conference of the user's account or to join another collaboration conference. The user's response may be received, in one example, by the user pressing one or more buttons on the requesting device. This response is then transmitted to the routing device to indicate the user's selection. If the user selects to not join a collaboration conference of the user's account, the routing device than performs operation 706 and prompts the user for an access code and/or passcode to connect the user to a collaboration conference. However, if the user selects to join a collaboration conference that is associated with the user's account, the routing device authenticates and routes the user's requesting device to a conferencing bridge in operation 714.

As can be appreciated, the operations of FIG. 7 operate such that the routing device can identify a requester to a collaboration conference and route the requester to a conference based on the requesting device identifier. In this example, the routing device may not obtain an access code and/or passcode to route the user to a collaboration conference. Rather, the user may be routed to a collaboration conference based on the requesting device identifier and a selection by the user to join a specific collaboration conference based on the identifier. By utilizing the identity of the requesting device to route the user to a collaboration conference, the network may reduce the number of prompts and responses transmitted between the requesting device and the routing device, thereby reducing the operational processing and cost of the network.

In the example that has one or more preferences associated with the user's account, the routing device may not only route the user to a specific collaboration conference, but may also set up one or more of the features available for the conference. For example, one account of the conferencing system may prefer to utilize a high-definition audio feature when attending a conference. Thus, upon receiving the requester's response in operation 712, the routing device may route the user to a collaboration conference and set-up the high-definition audio feature for the conference. In another embodiment, the routing device may query the user whether the high-definition audio feature should be established in the conference. Thus, when one or more preferences are associated with the account, the routing device may apply those preferences to the conference or prompt the user as to whether such preferences should be applied to the conference. The prompting of the user may occur during operation 712 and the application of the one or more preferences to the conference may occur in operation 714. In this manner, in addition to routing the user to a specific conference based on the requesting device identifier, the routing device may also provide one or more preferred features of the conference to the user's conference upon establishment of the collaboration conference.

Figure 8:
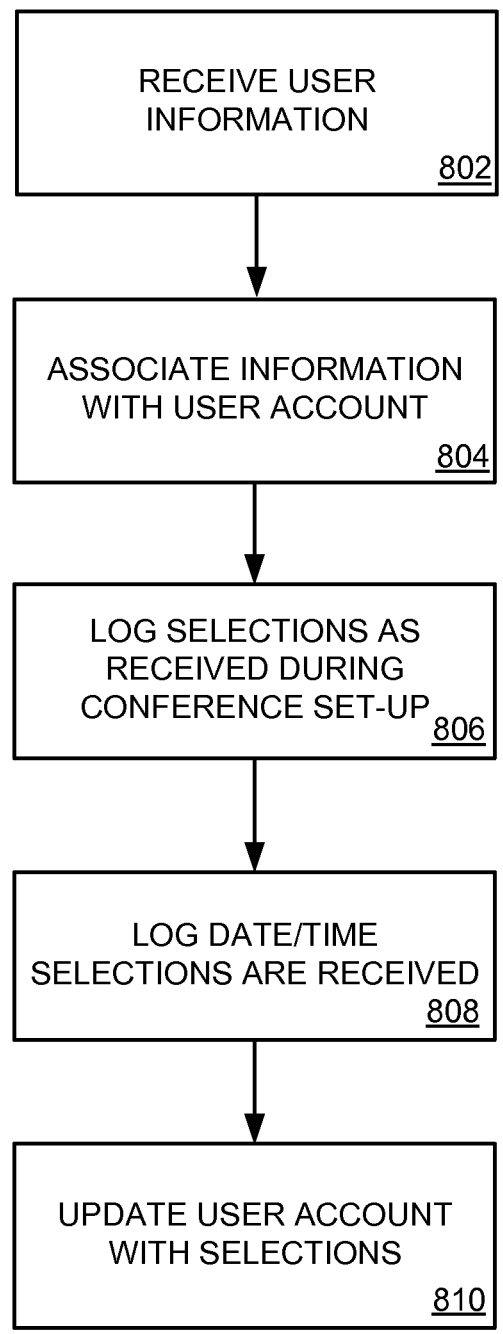
FIG. 8 is a flowchart of a method for a telecommunications network to collect preference information of a requesting device for use in routing a request based on an identifier of the requesting device.

As described above, the identifying information and/or one or more preferences may be associated with an account of a user of the conferencing system. To obtain or receive such information, the network (or routing device) may perform the operations outlined in the flowchart in FIG. 8. The operations of FIG. 8 are but one method by which the network may obtain or receive an identity of a requesting device and/or one or more preferences of a user of a network. Those of skill in the art will appreciate the many other methods by which such information may be gathered. As explained above, this gathered information may be stored in one or more databases associated with the network and utilized when routing a requesting device to a collaboration conference.

Beginning in operation 802, the network receives user information. More particularly, the network receives an identifier of a communication device that is associated with the user and is connected to the network. For example, the communication device may be the user's work phone, home phone, cellular phone, laptop, personal digital assistant, and the like. In general, the identifier obtained in operation 802 may be a telephone number, text string or any other identifier of the communication device associated with the user.

In addition, one or more collaboration conference preferences may be received in operation 802 from the user. As described above, a collaboration conference may include several features or options, such as high definition audio or video, conference bridge location preference, service quality, chairperson preference and the like. One or more of the options available to a user of the conferencing system may be received by the network in operation 802 as a preference of the user for collaboration conferences. Thus, similar to the identification information, the one or more preferences for a particular user is received in operation 802.

The network may receive this information in any manner in which information is provided to the network. For example, the user of the network may access a website and provide said information. Once entered, this information may be transmitted to a component of the network for processing and storing. In another example, the information may be obtained from the user when the user signs up for the collaboration conferencing feature of the network. In yet another example, the information may be obtained from a third party website or database that includes information concerning the user. In one such instance, the network may access a program or website through which the user stores identifiers, preferences, calendar dates and events, and the like and incorporate that information into the network to determine the user's preferences and/or identifying information. For example, the network may have access to a calendar feature on the user's desktop or laptop computer and utilize the information stored therein to determine a preference for the user.

In operation 804, the network associates the obtained identifiers and/or preferences with an account of the conferencing system associated with the user. For example, each subscriber of the collaboration conference may have an account number assigned to that subscriber by the network. Thus, the network associates the obtained information with the account number of the user. The network may also store the information in one or more databases associated with the network along with or associated with the user's account information. By storing the information with the user's account information, the network may access the information when the user is identified by the system, as explained in more detail above.

In addition to obtaining and storing the identifying information and/or the one or more preferences, the network may also update the information associated with any account. In operation 806, the network logs any selections or information received by the network associated with the account. For example, through an access code and/or passcode received by the network, the network may recognize that a particular user with an account is accessing the collaboration conferencing feature. The network may also obtain a telephone number associated with a communication device that the user is utilizing to access the network. With this information, the network may store the telephone number as an identifier of the user's account with the user's account information. In a similar manner, the network may store any selections made by the user during the conference as preferences of the user when utilizing the conferencing feature. This information may then be associated with the user's account for later use by the network in routing the user to a conference.

Similarly, the network may log the date and time that the user accessed the network and the one or more selections were made in operation 808 and update one or more preferences associated with the user's account in operation 810. For example, the network logs that a particularly identified user as accessing a particular conference, with one or more conference preferences, at a date and time. This information may aid the network in selecting which options are prompted to the user when accessing the conferencing feature. For example, the network may prompt the user, upon a receipt from the user to join a conference, to select a conference and/or one of more preferences based on the date and time that the request is received. In particular, the network may assume that the user, if a pattern of joining the same conference with the same preferences occurs routinely at the same or similar date and time, that the user intends to join that specific conference. In this manner, the date and time information may be gathered and utilized by the network in determining the identity of a user and one or more preferences for a collaboration conference that the user may desire.

Similarly, as mentioned above, the network may have access to one or more computers or programs associated with a user. In one example, the program contains an indication of a collaboration conference event of which the user may be a part. In particular, the program may be a calendar feature or application that the user utilizes to store collaboration conference meeting times and information. This information, due to the access granted to the network, is gathered and used in selecting the one or more preferences offered to the user during set-up of the conference. For example, the information may indicate that the user is to join a particular conference at a particular time. If a request to join a conference is received by the network from a requesting device associated with the user, the network may prompt the user to join the particular conference as indicated by the information in the calendar program. Thus, by using the stored information, the network may bypass prompting for and obtaining an access code and/or passcode for a conference and connect the user directly to a conference based on the information stored in the program. In this manner, the information gathered through the method of FIG. 8 may include information obtained from one or more programs or devices associated with the user that aids the network in identifying the one or more preferences for a collaboration conference for the user.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A telecommunications network comprising:
at least one conference bridge; and
at least one routing device configured to:
receive a communication from a user of the telecommunications network, the communication comprising a request to access a collaboration conference event, wherein the collaboration conference event is established at a first time, and wherein the communication is received at a second time after the first time;
obtain an identifier of a communication device associated with the telecommunications network and the user, the identifier comprising a telephone number of the communication device from which the request is received and obtained through an Automatic Number Identification (ANI) feature of the telecommunication network;
identify, based on the telephone number of the communication device from which the request is received, the collaboration conference event; and
connect the communication device to the collaboration conference event based on the telephone number of the communication device from which the request is received.

2. The telecommunications network as recited in claim 1 wherein the at least one routing device is further configured to determine a first role of the user for the collaboration conference event and a second role of a second user for the collaboration conference event, wherein the first role comprises a chairperson of the collaboration conference event and the second role comprises a non-chairperson participant.

3. The telecommunication network as recited in claim 1 wherein the at least one routing device is further configured to:
transmit a first prompt to the communication device to select the collaboration conference event;
receive a response to the prompt from the communication device; and
in the event that the response to the prompt received from the communication device is a first type of response, transmit a second prompt to the communication device requesting entry of an access code associated with the user.

4. The telecommunications network as recited in claim 1 wherein the identifier is a text string associated with the communication device, the text string included in a header of the communication from the user.

5. A system for initiating a collaboration conference in a telecommunications network, the system comprising:
a network interface unit configured to receive a first communication from a user of a communications network to establish a collaboration conference event on the network, wherein the collaboration conference event is established at a first time, the first communication received at a second time after the first time from a communication device associated with the communications network;
an application server in communication with the network interface unit; and
a computer-readable medium connected to the application server configured to store information and instructions that, when executed by the application server, performs the operations of:
obtaining an identifier of the communication device associated with the communications network, the identifier comprising a telephone number of the communication device from which the request is received and obtained through an Automatic Number Identification (ANI) feature of the communications network;
identifying, based on the telephone number of the communication device from which the request is received, the collaboration conference event; and
connecting the communication device to the collaboration conference event based on the telephone number of the communication device from which the request is received.

6. The system as recited in claim 5 wherein the application server further performs the operations of determining, based on the identifier of the communication device, one or more preferences including at least one of high definition audio, high definition video, conference bridge location or a specific quality of service.

7. The system as recited in claim 5 wherein the application server further performs the operations of:
transmitting a first prompt to the communication device to select the collaboration conference event;
receive a response to the prompt from the communication device; and
in the event that the response to the prompt received from the communication device is a first type of response, transmit a second prompt to the communication device requesting entry of an access code associated with the user.

8. The system as recited in claim 5 wherein the application server further performs the operations of:
receiving the telephone number of the communication device of the communication device from which the request is received from the user through a user interface; and
storing the telephone number of the communication device from which the request is received in the account of the user as an identifier of the user.

9. The system as recited in claim 8 wherein the application server further performs the operations of:
receiving one or more collaboration conference preferences from the user; and storing the one or more collaboration conference preferences in the account of the user.

10. The system as recited in claim 5 wherein the application server further logging a date and time of a second communication received from the communication device, the second communication configured to request to join a particular collaboration conference event; and
logging a date and time of a second communication received from the communication device, the second communication configured to request to join a particular collaboration conference event; and
storing the date and time of the second communication in the account of the user.

11. The system as recited in claim 10 wherein the application server further performs the operations of:
logging one or more collaboration conference selections received from the user through the communication device; and
storing the one or more collaboration conference selections as one or more collaboration conference preferences in the account of the user.

12. The system as recited in claim 9 wherein the receiving the one or more collaboration conference preferences from the user operation comprises accessing a program associated with the user, the program including the one or more collaboration conference preferences.

13. A method for initiating a collaboration conference in a telecommunications network comprising:
receiving a request message for access to a collaboration conference event from a requester's communication device, wherein the collaboration conference event is established at a first time, and wherein the request message is received at a second time after the first time;
obtaining an identifier of the requester's communication device, the identifier comprising a telephone number of the requester's communication device from which the request is received and obtained through an Automatic Number Identification (ANI) feature of the telecommunications network;
identifying, based on the telephone number of the requester's communication device from which the request is received, the collaboration conference event; and
connecting the requester's communication device to the collaboration conference event based on the telephone number of the requester's communication device from which the request is received.

14. The method as recited in claim 13 further comprising:
transmitting a first prompt to the requester's communication device, the first prompt configured to elicit a selection of the collaboration conference event; and
receive a response to the prompt from the requester's communication device.

15. The method as recited in claim 14 further comprising:
retrieving one or more collaboration conference preferences associated with the account of the requester; and
applying the one or more collaboration conference preferences to the collaboration conference event.

16. The telecommunications network as recited in claim 1 wherein the identifier of the communication device is a first identifier, wherein the at least one routing device is further configured to determine, based on the telephone number of the communication device from which the request is received, a second identifier associated with the user and at least one other user, and wherein to identify the collaboration conference event comprises to determine, based on the second identifier, the collaboration conference event.

17. The system as recited in claim 5 wherein the identifier of the communication device is a first identifier, wherein the application server further performs the operations of determining, based on the telephone number of the communication device from which the request is received, a second identifier associated with the user and at least one other user, and wherein identifying the collaboration conference event comprises determining, based on the second identifier, the collaboration conference event.

18. The method as recited in claim 13 wherein the identifier of the communication device is a first identifier, further comprising determining, based on the telephone number of the requestor's communication device from which the request is received, a second identifier associated with the requester and at least one other user, and wherein identifying the collaboration conference event comprises determining, based on the second identifier, the collaboration conference event.

\* \* \* \* \*